United States Patent
Liu et al.

(10) Patent No.: US 11,869,457 B2
(45) Date of Patent: Jan. 9, 2024

(54) SYNCHRONOUS DISPLAY METHOD AND SYSTEM, ELECTRONIC DEVICE AND COMPUTER READABLE MEDIUM

(71) Applicant: BOE Technology Group Co., Ltd., Beijing (CN)

(72) Inventors: Genyu Liu, Beijing (CN); Tao Li, Beijing (CN); Xingqun Jiang, Beijing (CN); Chao Yu, Beijing (CN); Quanzhong Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/417,592

(22) PCT Filed: Nov. 3, 2020

(86) PCT No.: PCT/CN2020/126175
§ 371 (c)(1),
(2) Date: Jun. 23, 2021

(87) PCT Pub. No.: WO2021/088807
PCT Pub. Date: May 14, 2021

(65) Prior Publication Data
US 2022/0114987 A1    Apr. 14, 2022

(30) Foreign Application Priority Data
Nov. 8, 2019    (CN) .......................... 201911089457.3

(51) Int. Cl.
*G09G 5/14*    (2006.01)
*G06F 3/14*    (2006.01)
*G09G 5/12*    (2006.01)

(52) U.S. Cl.
CPC ............. *G09G 5/14* (2013.01); *G06F 3/1423* (2013.01); *G09G 5/12* (2013.01); *G09G 2310/0232* (2013.01); *G09G 2340/0407* (2013.01)

(58) Field of Classification Search
CPC .... G09G 5/14; G09G 5/12; G09G 2310/0232; G09G 2340/0407; G06F 3/1423
See application file for complete search history.

(56) References Cited

U.S. PATENT DOCUMENTS 10,079,963 B1*    9/2018    Liu .................... H04L 65/70
2014/0111530 A1*    4/2014    Choi .................. G06F 12/00
345/545

(Continued)

FOREIGN PATENT DOCUMENTS

| CN | 105979335 A | 9/2016 |
| CN | 106909332 A | 6/2017 |
| CN | 109582420 A | 4/2019 |

*Primary Examiner* — Matthew A Eason
*Assistant Examiner* — Sujit Shah
(74) *Attorney, Agent, or Firm* — Nath, Goldberg & Meyer; Joshua B. Goldberg

(57) ABSTRACT

The present disclosure provides a synchronous display method of a spliced screen, a display system, an electronic device and a computer readable medium. The spliced screen includes display screens spliced together, and the display method is based on wireless communication and includes: sending control information to the spliced screen for N times at intervals so as to control the display screens to display simultaneously, where N is not less than 2 and is an integer, the control information sent for previous N−1 times includes first information and second information, the control information sent for an $N^{th}$ time at least includes the second information, the first information is configured for controlling the display screen receiving the control information to turn off a receiving component of the display screen, the (Continued)

second information is configured for controlling the display screen receiving the control information to display after a preset time duration.

9 Claims, 1 Drawing Sheet

(56) References Cited

U.S. PATENT DOCUMENTS

| | | | | |
|---|---|---|---|---|
| 2015/0187238 A1* | 7/2015 | Hall | ............... | G06F 3/1423 |
| | | | | 40/544 |
| 2016/0357493 A1* | 12/2016 | Zerwas | ............... | G09G 5/12 |
| 2017/0278485 A1 | 9/2017 | Chen | | |
| 2018/0267594 A1* | 9/2018 | Meier | ............... | G06F 3/147 |
| 2019/0206364 A1* | 7/2019 | Jeong | ............... | G09G 3/2096 |
| 2020/0042275 A1* | 2/2020 | Yueh | ............... | G06F 3/147 |

* cited by examiner

SYNCHRONOUS DISPLAY METHOD AND SYSTEM, ELECTRONIC DEVICE AND COMPUTER READABLE MEDIUM

CROSS-REFERENCE TO RELATED APPLICATIONS

This is a National Phase Application filed under 35 U.S.C. 371 as a national stage of PCT/CN2020/126175, filed Nov. 3, 2020, an application claiming priority of Chinese Patent Application No. 201911089457.3, filed on Nov. 8, 2019, the contents of each which are incorporated herein in their entirety by reference.

TECHNICAL FIELD

The present disclosure relates to the field of display technology, and particularly relates to a synchronous display method of a spliced screen, a synchronous display system, an electronic device and a computer readable medium.

BACKGROUND

The spliced screen can be used in large-scale performance and includes a plurality of display screens which can independently display, and the display contents of all the display screens are spliced together to form complete display contents. At present, in the process of performing by using the spliced screen, each display screen is fixedly installed on a support structure and receives a signal of content to be displayed in a wired transmission manner.

SUMMARY

In a first aspect, an embodiment of the present disclosure provides a synchronous display method of a spliced screen, where the spliced screen includes a plurality of display screens that are spliced together, and the display method is based on wireless communication and includes:

sending control information to the spliced screen for N times at intervals to control the display screens in the spliced screen to display simultaneously, where N is more than or equal to 2 and is an integer, the control information sent for previous N−1 times includes first information and second information, and the control information sent for an $N^{th}$ time at least includes the second information, the first information is configured for controlling the display screen receiving the control information to turn off a receiving component of the display screen, the second information is configured for controlling the display screen receiving the control information to display after a preset time duration, and a time difference between preset time durations of the control information sent for any two times adjacent to each other is equal to a time interval of sending the control information of the two times.

In some implementations, the time interval of sending control information of any two adjacent times is constant.

In some implementations, the sending the control information to the spliced screen for N times at intervals to control the display screens in the spliced screen to display simultaneously includes:

sending the control information to the spliced screen for N times at intervals through a LoRa base station so as to control the display screens in the spliced screen to display simultaneously.

In some implementations, the control information includes a broadcast message.

In a second aspect, an embodiment of the present disclosure provides a display system, including: a wireless communication device and a spliced screen including a plurality of display screens spliced together, the wireless communication device is configured to send control information to the spliced screen for N times at intervals so as to control the display screens in the spliced screen to display simultaneously, where N is not less than 2 and is an integer, the control information sent for previous N−1 times includes first information and second information, and the control information sent for an $N^{th}$ time at least includes the second information, the first information is configured for controlling the display screen receiving the control information to turn off a receiving component of the display screen, the second information is configured for controlling the display screen receiving the control information to display after a preset time duration, and a time difference between preset time durations of the control information sent for any two times adjacent to each other is equal to a time interval of sending the control information of the two times.

In some implementations, the wireless communication device includes a LoRa base station.

In some implementations, each display screen of the spliced screen includes a receiving component and a motherboard card, the receiving component is configured to receive control information sent by the wireless communication device;

the motherboard card is configured to control the display screen to display according to the control information received by the receiving component.

In a third aspect, an embodiment of the present disclosure provides an electronic device, including:

one or more processors;

a storage device having one or more programs stored thereon, which when executed by the one or more processors, cause the one or more processors to implement the synchronous display method in the first aspect described above.

In a fourth aspect, the present disclosure provides a computer readable medium, on which a computer program is stored, where the program is executed by a processor to implement the synchronous display method in the first aspect.

DESCRIPTION OF EMBODIMENTS

Figure 1:
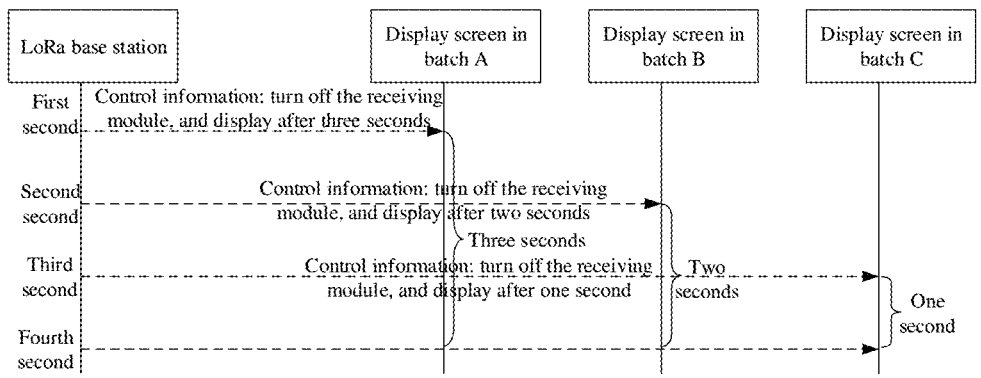
FIG. 1 is a flowchart of a synchronous display method of a spliced screen according to an embodiment of the present disclosure.

In order that those skilled in the art will better understand the technical solutions of the present disclosure, the following detailed description is given with reference to the accompanying drawings and the specific implementations.

Unless defined otherwise, technical or scientific terms used herein shall have the ordinary meaning as understood by one of ordinary skill in the art to which the present disclosure belongs. The use of "first", "second" and the like in the present disclosure is not intended to indicate any order, quantity, or importance, but rather is used to distinguish one element from another. Also, the use of the terms "a", "an" or "the" and similar referents do not denote a limitation of quantity, but rather denote the presence of at least one. The word "including" or "comprising" and the like is intended to mean that the element or item preceding the word contains the element or item listed after the word and its equivalent, but not the exclusion of other elements or items. The terms "connected" or "coupled" and the like are not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

It should be noted that the spliced screen in the embodiment of the present disclosure is formed by splicing a plurality of display screens; the synchronous display method provided by the embodiment of the present disclosure is particularly suitable for displaying of the spliced screen, the number of the display screens in the spliced screen may reach thousands, and due to a large size of the spliced screen, the spliced screen in the embodiment of the present disclosure may be a folding screen.

In the following embodiment of the present disclosure, the implementation of the synchronous display method of the spliced screen is implemented based on the communication between the wireless communication device and the spliced screen, where the wireless communication device includes, but is not limited to, a Long Range (LoRa) base station, and the following description is given by taking the wireless communication device being a LoRa base station as an example. Since the spliced screen in the embodiment of the present disclosure can wirelessly communicate with the wireless communication device, it should be understood that there should be a wireless receiving component on each display screen of the spliced screen, and the wireless receiving component communicates with the LoRa base station through a corresponding protocol.

In a first aspect, an embodiment of the present disclosure provides a synchronous display method for a spliced screen, where the spliced screen includes a plurality of display screens that are spliced together, and the synchronous display method is based on wireless communication and includes:

sending control information to the spliced screen for N times at intervals so as to control the display screens in the spliced screen to display simultaneously, where N is not less than 2 and is an integer, the control information sent for previous N−1 times includes first information and second information, the control information sent for an $N^{th}$ time at least includes the second information, the first information is configured for controlling the display screen receiving the control information to turn off a receiving component of the display screen, the second information is configured for controlling the display screen receiving the control information to display after a preset time duration, and a time difference between preset time durations of the control information sent for any two times adjacent to each other is equal to a time interval of sending the control information of the two times.

It should be noted that, in the embodiment of the present disclosure, the preset time durations of the second information of the control information sent at different times are different from each other, so that it is ensured that the display screens can simultaneously display.

In the embodiment of the present disclosure, a value of N is obtained in advance through testing, and is a minimum number of times for sending the control information that enables each display screen in the spliced screen can receive the control information.

Specifically, with the synchronous display method provided in the embodiment of the present disclosure, the control information may be sent to the spliced screen for N times at intervals through the LoRa base station, after the control information is sent for at least the previous N−1 times, the display screen that receives the control information can turn off the receiving component thereof according to the first information, and display at a predetermined timing (i.e., after a preset time duration) according to the second information, and the display screen that receives the control information sent for the $N^{th}$ time may directly display after the preset time duration according to the second information, or may turn off the receiving component thereof first and then display. By adopting the synchronous display method in the embodiment of the disclosure, the display screens can be effectively controlled to display simultaneously, so that the display effect of the spliced screen is better, and better experience is provided for users.

In some implementations, the control information may specifically be a broadcast message.

In some implementations, the time interval of sending the control information of any two adjacent times is constant. For example, the synchronous display method according to the embodiment of the present disclosure is described by taking an example in which the time interval of sending the control information of any two adjacent times is one second (for short, s) and N=3 (i.e., the control information is sent three times).

Specifically, as shown in FIG. 1, in a first second, the LoRa base station sends the control information, and the display screen (for example, a display screen in batch A) that receives the control information turns off the receiving component thereof and displays after three seconds.

In a second second, the LoRa base station sends the control information, and the display screen (e.g., a display screen in batch B) that receives the control information turns off the receiving component thereof and displays after two seconds.

In a third second, the LoRa base station sends the control information, and the display screen (e.g., a display screen in batch C) that receives the control information may turn off the receiving component thereof, or may display after one second without turning off the receiving component thereof.

In a fourth second, all the display screens receiving the control information display simultaneously, so that synchronous display of the spliced screen can be completed.

Here, the display principle of each display screen of the spliced screen will be explained. The content to be displayed on each display screen may be stored in the respective motherboard card in advance, after the wireless receiving component of the display screen receives the control information sent by the LoRa base station, the receiving component of the display screen is turned off, and the motherboard card of the display screen executes control to enable the display screen to display according to the content to be displayed after the preset time duration, so that a corresponding display picture is presented on the display screen.

Figure 2:
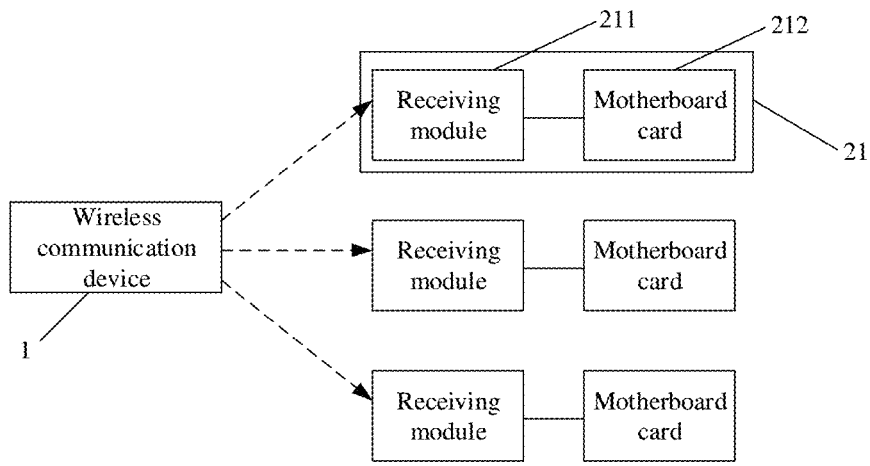
FIG. 2 is a schematic diagram of a display system according to an embodiment of the present disclosure.

In a second aspect, as shown in FIG. 2, an embodiment of the present disclosure provides a display system, which includes a wireless communication device 1 and a spliced screen 2, where the spliced screen 2 includes a plurality of display screens 21 spliced together, the wireless communication device 1 is configured to send control information to the spliced screen for N times at intervals, to control the display screens 21 in the spliced screen 2 to display simultaneously, N is not less than 2 and is an integer, the control information sent for previous N−1 times includes first information and second information, the control information sent for an $N^{th}$ time at least includes the second information, the first information is configured for controlling the display screen 21 receiving the control information to turn off the receiving component 211 thereof, the second information is configured for controlling the display screen 21 receiving the control information to display after a preset time duration, and a time difference between preset time durations of the control information sent for any two times is equal to a time interval of sending the control information of the two times.

In the display system of the embodiment of the present disclosure, the control information may be sent to the spliced display for N times at intervals through the wireless communication device 1, after the control information is sent for at least the previous N−1 times, the display screen 21 that receives the control information turns off the respective receiving component 211 thereof according to the first information, and displays at a predetermined timing (i.e., after a preset time duration) according to the second information, and the display screen 21 that receives the control information sent for the $N^{th}$ time may directly display after the preset time duration according to the second information, or may turn off the receiving component 211 thereof first and then display. By adopting the display system of the embodiment of the present disclosure, the display screens 21 of the spliced screen 2 can be effectively controlled to display simultaneously, so that the display effect of the spliced screen 2 is better, and better experience is provided for users.

Figure 3:
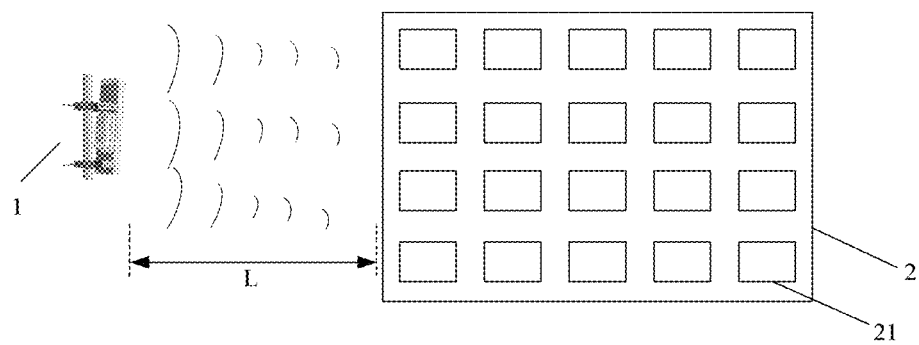
FIG. 3 is a schematic diagram of communication between a LoRa base station and a spliced screen according to an embodiment of the present disclosure.

In some implementations, the wireless communication device 1 in the embodiment of the present disclosure includes, but is not limited to, a LoRa base station. When the wireless communication device 1 is a LoRa base station, as shown in FIG. 3, it is assumed that the LoRa base station is located at a side (e.g., left side) of the spliced screen 2, and distances from the LoRa base station to opposite side edges (e.g., an upper side edge and a lower side edge) of the spliced screen 2 are equal to each other, where L represents a distance from the LoRa base station to the spliced screen 2, which may be equal to 30 meters (for short, m). It is further assumed that, the spliced screen 2 is in a size of 10 m*10 m. The propagation velocity of electromagnetic wave in vacuum is $C=3\times10^8$ m/s, the propagation velocity of electromagnetic wave in air is smaller than that in vacuum, but the difference between the propagation velocity of electromagnetic wave in vacuum and the propagation velocity of electromagnetic wave in air is very small. Generally speaking, the propagation velocity of electromagnetic wave in air is also $3\times10^8$ m/s. The time duration, during which the signal communicated between the LoRa base station and the display screen 21 closest to the LoRa base station is transmitted in the air, is $T1=L/c=30/(3\times10^8)=0.0001$ ms. The time duration, during which the signal communicated between the LoRa base station and the display screen 21 farthest to the LoRa base station is transmitted in the air, is $T2=(\sqrt{(L+10)^2+(10/2)^2}/(3\times10^8)\approx0.000134$ ms. As can be seen, in the entire display system, a time delay for transmitting the control information sent by the wireless communication device 1 to the display screen 21 farthest to the wireless communication device 1 is very small, and is at a microsecond level. For example, assuming that the display screens 21 closest and farthest to the wireless communication device 1 each display immediately after receiving the control information, human's eyes cannot distinguish the display asynchrony caused by the time delay due to a propagation distance of the control information.

In some implementations, each display screen 21 of the spliced screen 2 includes a receiving component 211 and a motherboard card 212, the content to be displayed on each display screen 21 may be pre-stored in the respective motherboard card 212, after the wireless receiving component 211 of the display screen 21 receives the control information sent by the LoRa base station, the receiving component 211 of the display screen 21 is turned off, and the motherboard card 212 of the display screen 21 performs control so that the display screen 21 displays according to the content to be displayed after a preset time duration, so as to present a corresponding display picture on the display screen 21.

In a third aspect, an embodiment of the present disclosure provides an electronic device, including: one or more processors; a storage device having one or more programs stored thereon, which when executed by the one or more processors, cause the one or more processors to implement the synchronous display method in the first aspect described above.

In a fourth aspect, an embodiment of the present disclosure provides a computer readable medium, on which a computer program is stored, where the program is executed by a processor to implement the synchronous display method in the first aspect.

It will be understood by those of ordinary skill in the art that all or some of the steps of the synchronous display method disclosed above, as well as functional components in the system, device, etc., may be implemented as software, firmware, hardware, or a suitable combination thereof. In a hardware implementation, the division between functional components mentioned in the above description does not necessarily correspond to the division of physical components; for example, one physical component may have multiple functions, or one function or step may be performed by several physical components in cooperation. Some or all of the physical components may be implemented as software executed by a processor, such as a central processing unit, a digital signal processor, or a microprocessor, or implemented as hardware, or implemented as an integrated circuit, such as an application specific integrated circuit. Such software may be distributed on a computer readable medium, which may include a computer storage medium (or a non-transitory medium) and a communication medium (or a transitory medium). The computer storage medium includes volatile and nonvolatile, removable and non-removable medium implemented in any method or technology for storage of information such as computer readable instructions, data structures, program modules or other data, as is well known to those skilled in the art. The computer storage medium includes, but is not limited to, RAM, ROM, EEPROM, flash memory, CD-ROM, Digital Versatile Disks (DVD), magnetic cassettes, magnetic tape, magnetic disk storage, or any other medium which can be used to store the desired information and which can be accessed by a computer. In addition, the communication medium typically embodies computer readable instructions, data structures, program modules or other data in a modulated data signal such as a carrier wave or other transport mechanism and includes any information delivery medium, as is well known to those skilled in the art.

It will be understood that the above implementations are merely exemplary implementations employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. A synchronous display method of a spliced screen, where the spliced screen comprises a plurality of display screens spliced together, and the display method is based on wireless communication and comprises:
   sending control information to the spliced screen for N times at intervals to control the display screens in the spliced screen to display simultaneously, wherein N is not less than 2 and is an integer, the control information sent for previous N−1 times comprises first information and second information, and the control information sent for an $N^{th}$ time at least comprises the second information;
   the first information is configured for controlling the display screen receiving the control information to turn off a receiving component of the display screen, the second information is configured for controlling the display screen receiving the control information to display after a preset time duration, the preset time duration is greater than 0, and a time difference between preset time durations of the control information sent for any two times adjacent to each other is equal to a time interval of sending the control information of the two times,
   wherein the time interval t0 of sending the control information of any two times adjacent to each other is greater than 0, the display screens receive the control information at different timings, and for the control information sent for any two times adjacent to each other, the time difference Δt between the preset time duration of first control information and the preset time duration of second control information is equal to t0, and the display screens receiving the first control information and the second control information display after different preset time durations respectively,
   the time interval t0 of sending the control information of any two times adjacent to each other is constant, and the time difference Δt between the preset time durations of the control information sent for any two times adjacent to each other is constant.

2. The synchronous display method according to claim 1, wherein the sending the control information to the spliced screen for N times at intervals to control the display screens in the spliced screen to display simultaneously comprises:
   sending the control information to the spliced screen for N times at intervals through the LoRa base station so as to control the display screens in the spliced screen to display simultaneously.

3. The synchronous display method according to claim 1, wherein the control information comprises a broadcast message.

4. An electronic device, comprising:
   one or more processors;
   a storage device having one or more programs stored thereon which, when executed by the one or more processors, cause the one or more processors to implement the synchronous display method according to a claim 1.

5. A non-transitory computer readable medium, on which a computer program is stored, the computer program, when being executed by a processor, causes the synchronous display method according to claim 1 to be implemented.

6. A display system, comprising: a wireless communication device and a spliced screen comprising a plurality of display screens spliced together,
   the wireless communication device is configured to send control information to the spliced screen for N times at intervals so as to control the display screens in the spliced screen to display simultaneously, wherein N is not less than 2 and is an integer, the control information sent for previous N−1 times comprises first information and second information, the control information sent for an $N^{th}$ time at least comprises the second information,
   the first information is configured for controlling the display screen receiving the control information to turn off a receiving component of the display screen, the second information is configured for controlling the display screen receiving the control information to display after a preset time duration, the preset time duration is greater than 0, and a time difference between preset time durations of the control information sent for any two times adjacent to each other is equal to a time interval of sending the control information of the two times,
   wherein the time interval t0 of sending the control information of any two times adjacent to each other is greater than 0, the display screens receive the control information at different timings, and for the control information sent for any two times adjacent to each other, the time difference Δt between the preset time duration of first control information and the preset time duration of second control information is equal to t0, and the display screens receiving the first control information and the second control information display after different preset time durations respectively,
   the time interval t0 of sending the control information of any two times adjacent to each other is constant, and the time difference Δt between the preset time durations of the control information sent for any two times adjacent to each other is constant.

7. The display system according to claim 6, wherein the wireless communication device comprises a LoRa base station.

8. The display system according to claim 6, wherein each display screen of the spliced screen includes a receiving component and a motherboard card,
   the receiving component is configured to receive the control information sent by the wireless communication device;
   the motherboard card is configured to control the display screen to display according to the control information received by the receiving component.

9. The display system according to claim 6, wherein the control information comprises a broadcast message.

* * * * *